United States Patent [19]

Mochida et al.

[11] Patent Number: 4,740,408

[45] Date of Patent: Apr. 26, 1988

[54] CERAMIC HONEYCOMB BODY

[75] Inventors: Shigeru Mochida, Kasugai; Masaru Kojima; Jun Kitagawa, both of Nagoya; Koichi Ikeshima, Okazaki, all of Japan

[73] Assignee: NGK Insulators, Ltd., Tokyo, Japan

[21] Appl. No.: 803,237

[22] Filed: Dec. 2, 1985

[30] Foreign Application Priority Data

Jan. 21, 1985 [JP] Japan .................................. 60-7362

[51] Int. Cl.⁴ ................................................ B32B 3/12
[52] U.S. Cl. ...................................... 428/116; 55/523; 156/89; 422/179; 428/188; 502/527
[58] Field of Search ................. 428/73, 116, 117, 118, 428/188; 55/523; 502/527; 156/89; 422/179

[56] References Cited

U.S. PATENT DOCUMENTS

| | | | |
|---|---|---|---|
| 3,705,617 | 12/1972 | Miller et al. | 165/179 X |
| 3,790,654 | 2/1974 | Bagley | 428/116 X |
| 3,853,485 | 12/1974 | Hogan | 428/118 X |
| 3,885,977 | 5/1975 | Lachman et al. | 428/116 X |
| 3,899,326 | 8/1975 | Frost et al. | 428/116 X |
| 3,903,341 | 9/1975 | Gerhold | 428/116 |
| 3,905,743 | 9/1975 | Bagley | 425/464 |
| 3,982,100 | 9/1976 | Hervert | 428/116 X |
| 3,983,283 | 9/1976 | Bagley | 428/116 |
| 4,233,351 | 11/1980 | Okumura et al. | 428/116 X |
| 4,283,210 | 8/1981 | Mochida et al. | 264/60 X |
| 4,340,501 | 7/1982 | Davidson | 165/177 X |
| 4,350,613 | 9/1982 | Nishino et al. | 423/247 X |
| 4,364,761 | 12/1982 | Berg et al. | 156/89 X |
| 4,404,007 | 9/1983 | Tukao et al. | 428/117 X |
| 4,425,305 | 1/1984 | Retallick | 110/203 X |
| 4,556,543 | 12/1985 | Mochida et al. | 422/179 X |
| 4,643,749 | 2/1987 | Miura | 428/116 X |
| 4,645,700 | 2/1987 | Matsuhisa et al. | 165/10 X |

FOREIGN PATENT DOCUMENTS 211284 7/1984 German Democratic Rep. .................................. 502/527

OTHER PUBLICATIONS

European Search Report, EP 85 30 8685; 4 pages.

Primary Examiner—Henry F. Epstein
Attorney, Agent, or Firm—Parkhurst & Oliff

[57] ABSTRACT

A ceramic honeycomb body has a plurality of through holes defined by partition walls so as to be separated from each other, and fins are integrally formed with selected partition walls so as to extend into the through holes surrounded by such selected partition walls, whereby the cross-sectional area of the through hole is selectively reduced by the fins thus provided.

21 Claims, 3 Drawing Sheets

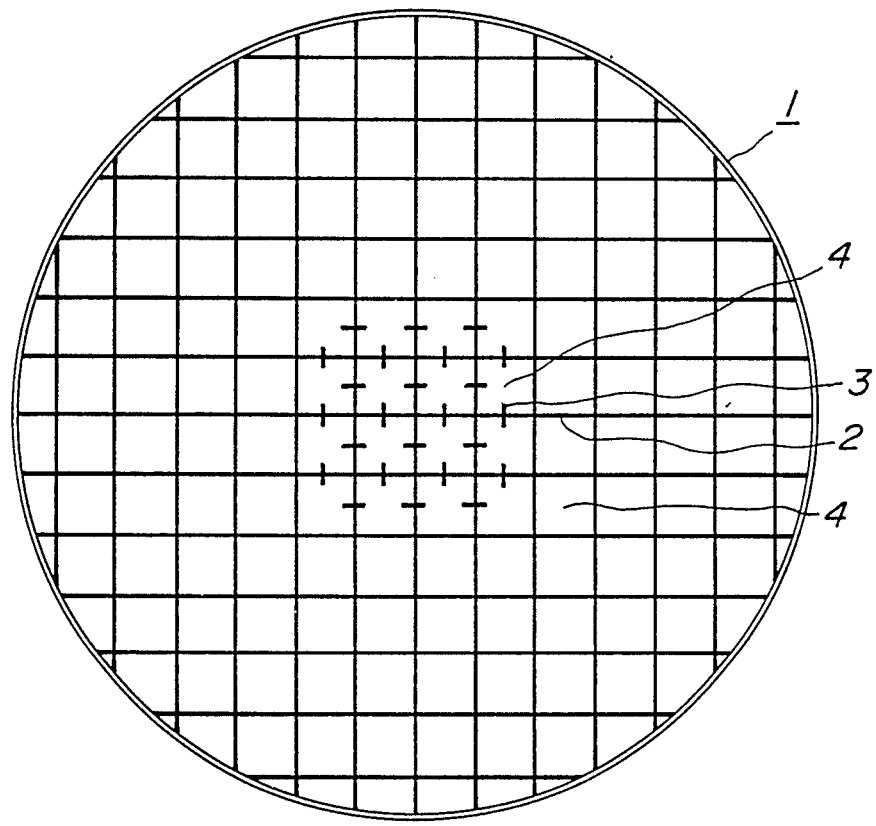
FIG_1
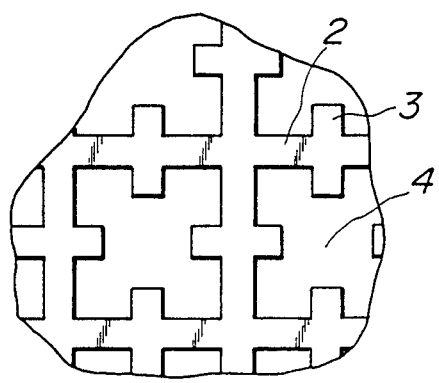
FIG_2

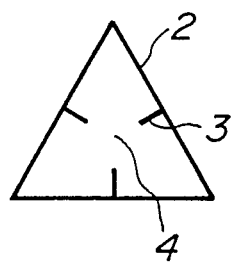
FIG_3A
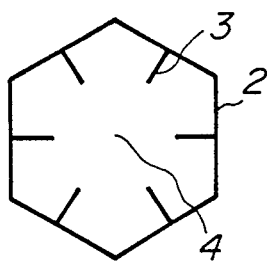
FIG_3B
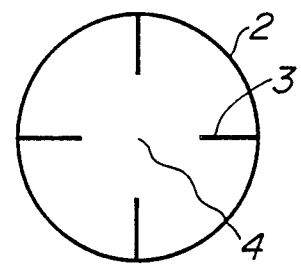
FIG_3C
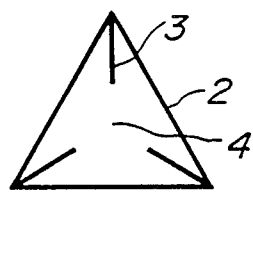
FIG_3D
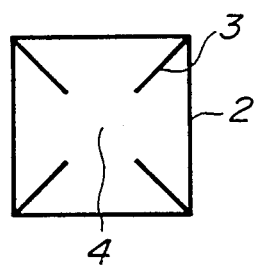
FIG_3E
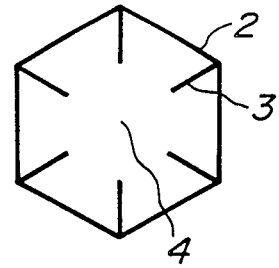
FIG_3F
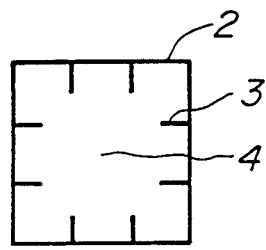
FIG_3G

CERAMIC HONEYCOMB BODY

This invention relates to a ceramic honeycomb body. More particularly, the invention relates to a ceramic honeycomb body suitable for carrying catalyzers to purify exhaust gas from internal combusion engines, for purifying such exhaust gas by filtering fine particles therefrom, and for purifying and deodorizing combustion gas generated when fuels such as gaseous fuels and petroleum are combusted.

The ceramic honeycomb body has a high heat resistivity, a high corrosion resistivity, and a low pressure loss for fluid passing therethrough. Moreover, their contact area with gas being treated can be made large. Accordingly, it is used in many applications, such as (i) a carrier of catalyzers for purifying exhaust gas from internal combustion engines (Japanese Patent Laid-open Publication No. 75,611/1975, U.S. Pat. No. 3,885,977), (ii) a filter for purifying exhaust gas of internal combustion engines by removing fine particles therefrom (Japanese Patent Laid-open Publication No. 124,417/1981, U.S. Pat. No. 4,364,761), and (iii) a carrier of catalyzers for various burners and cooking utensils (Japanese Patent Laid-open Publication No. 27,139/1982, U.S. Pat. No. 4,350,613).

The ceramic honeycomb bodies for the above applications have a plurality of through holes which provide for contact surface areas for the gas being treated (in the case of filter, one side end opening of each through hole is closed in a checker-board manner). The cross-sectional shape of the through hole can be triangular, rectangular, circular, or the like, depending on the required levels of pressure loss of combustion gas and thermal shock resistivity.

To increase the surface area of the honeycomb body per unit volume (to be referred to as "geometrical surface area", hereinafter), it has been proposed to attach ceramic particles on the surfaces of the through holes (Japanese Patent Laid-open Publication No. 14,921/1983, U.S. Pat. No. 4,404,007).

In general, combustion gas from a combustion chamber is brought to the ceramic honeycomb body through a pipe, and the total area of end openings of the through holes in the ceramic honeycomb body is larger than the cross-sectional area of that pipe so as to provide the required contact area between the gas being treated and the surface of the ceramic honeycomb body. Due to such large total area of the through hole end openings, the conventional ceramic honeycomb body has a shortcoming in that the gas being treated tends to be concentrated at the central portion thereof, so that the central portion of the ceramic honeycomb body tends to be deteriorated quickly and sufficient purifying power cannot be maintained for a long period of time.

To prevent such concentration of the gas being treated at the central portion of the ceramic honeycomb body, it has been proposed to dispose a gas dispersing member in front of the inlet end of the ceramic honeycomb body. It is also proposed to increase the cell density (being defined as the number of through holes per unit cross-sectional area of the ceramic honeycomb body) at the central portion of the ceramic honeycomb body where the flow rate of the combustion gas is high (U.S. Pat. No. 3,853,485).

Further, in the case of cleaning the exhaust gas from internal combustion engines, it has been proposed to use different kinds of catalyzers at the central portion of the ceramic honeycomb body than at the peripheral portion thereof (Japanese Utility Model Laid-open Publication No. 39,639/1984).

However, the ceramic honeycomb body of the above-mentioned Japanese Patent Laid-open Publication No. 14,921/1983, which carries ceramic particles attached to the surface of the partition wall thereof, has shortcomings in that the ceramic particles tend to scale off when exposed to thermal shock or mechanical vibration transmitted from the ambient and in that its process of manufacture is complicated.

The ceramic honeycomb body disclosed by the above-mentioned U.S. Pat. No. 3,853,485 has a shortcoming in that its thermal shock resistivity is low because its cell density is high at the central portion thereof.

In the ceramic honeycomb body of the above-mentioned Japanese Utility Model Laying-open Publication No. 39,639/1984, the use of different kinds of catalyzers at different portions thereof is reflected in a shortcoming of complicated catalyzer mounting process.

Therefore, an object of the invention is to obviate the above-mentioned shortcomings of the prior art by providing an improved ceramic honeycomb body whose geometrical surface area is enlarged without reducing the thermal shock resistivity thereof.

Another object of the invention is to provide a ceramic honeycomb body which can be produced by a simple process.

To fulfill the above objects, an embodiment of the ceramic honeycomb body according to the present invention has a plurality of through holes each of which holes is enclosed by partition walls and fins integrally secured to the surface of selected partition walls so as to extend into the through holes surrounded by such selected partition walls such that the fins do not meet to form walls which subdivide the through holes.

In another embodiment of the ceramic honeycomb body of the invention, the cross-sectional area of the through hole after deducting the cross-sectional areas of the fins therein is smaller in the central portion of the ceramic honeycomb body than that in other portions thereof.

In another embodiment of the invention, at least the central portion of the ceramic honeycomb body has fins integrally secured to the partition walls thereof.

Preferably, the fins and the partition walls in the ceramic honeycomb body of the invention are formed by extrusion and are then sintered.

An example of the material of the partition walls and the fins in the ceramic honeycomb body of the invention is cordierite.

For a better understanding for the invention, reference is made to the accompanying drawings, in which:

FIG. 1 is an end view of an embodiment of the ceramic honeycomb body according to the invention;

FIG. 2 is a fragmentary enlarged view of the ceramic honeycomb body of FIG. 1;

FIGS. 3A–3G show a variety of cross-sectional shapes for the through holes in the ceramic honeycomb body of the invention.

Figure 4:
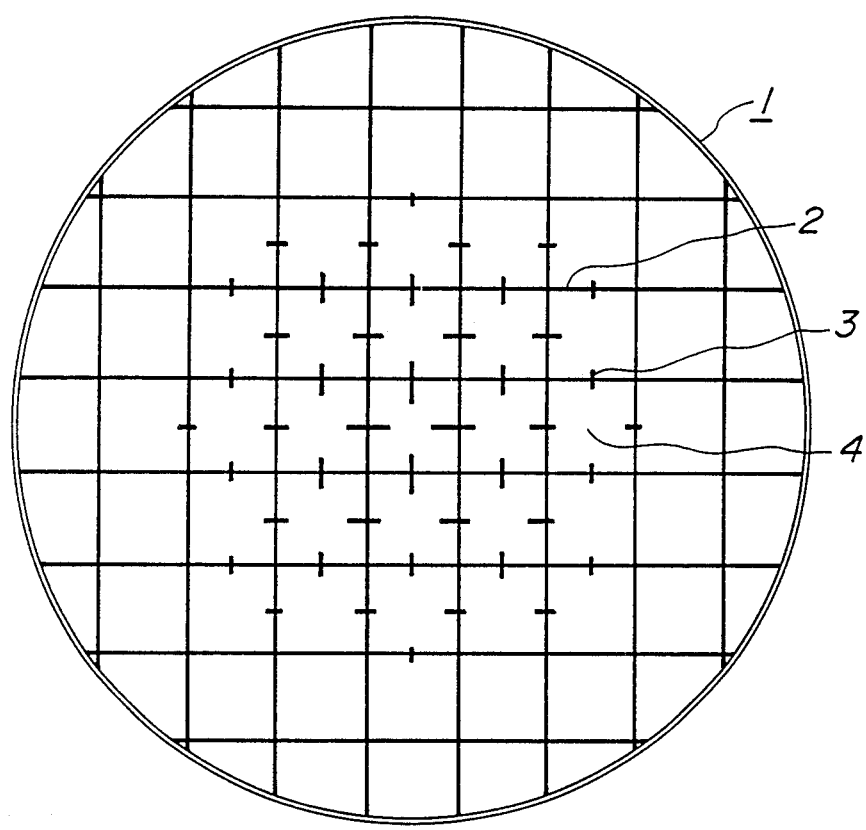
FIG. 4 is an end view of another embodiment of the ceramic honeycomb body according to the invention.

Throughout different views of the drawings, 1 is a ceramic honeycomb body, 2 is a partition wall, 3 is a fin and 4 is a through hole.

Referring to FIG. 1 and FIG. 2, a ceramic honeycomb body 1 according to the invention has a plurality of through holes 4, each of which is surrounded by partition walls 2. Fins 3 are integrally secured to the surfaces of selected partition walls 2.

In the example of FIG. 1, fins 3 are integrally formed on the surfaces of the partition walls 2 only in the central portion of the ceramic honeycomb body 1. The reason for providing the fins 3 only in the central portion of the ceramic honeycomb body 1 is in that the gas being treated tends to be concentrated at the central portion of the ceramic honeycomb body 1, resulting in an accelerated deterioration of the body 1 at the central portion. Thus, the invention intends to eliminate the occurrence of the accelerated deterioration of the central body portion which tends to hamper efficient purification of the combustion gas.

The present invention is not restricted to the arrangement of FIG. 1, and the fins 3 can be secured to all the partition walls 2 of the ceramic honeycomb body including those in the peripheral portion thereof.

Referring to FIG. 1, the height of the fin 3 extending into the through hole 4 is preferably about 20–30% of the length of one side of the partition wall 2 in the case of polygonal through hole 4. The thickness of the fin 3 is the same as that of the partition wall 2 in the case of the example of FIG. 1, and preferably the fin 3 is not thicker than the partition wall 2. As can be seen from FIG. 1, an outer peripheral wall thicker than the partition wall 2 can be provided on the peripheral surface of the ceramic honeycomb body 1. Referring to the fragmentary enlarged view of FIG. 2, when fins 3 are integrally secured to the partition walls 2, for instance in the central portion of the ceramic honeycomb body 1 as shown in FIG. 1, the cross-sectional area of the through hole 4 surrounded by such partition walls 2, e.g., the hole 4 in the body central portion, is reduced by an amount corresponding to the total cross-sectional area of the fins 3 in that through hole 4. Accordingly, the thickness of the fin 3 and the thickness of the partition wall 2 should be carefully selected while considering how the ceramic honeycomb body 1 is used.

Preferably, the fin 3 is formed as an integral part of the partition wall 2 by extrusion and then sintered. The material of the partition wall 2 and the fin 3 is preferably cordierite. However, the material of the ceramic honeycomb body 1 is not restricted only to cordierite as will be described hereinafter.

Referring to FIG. 3, the cross-sectional shape of the through hole 4 is not limited to a square as shown in FIG. 1. In fact, the shape of the through hole 4 defined by the partition wall 2 can be triangular, hexagonal, other polygonal shapes or circular shapes. The fin 3 can be secured to the planar portion of the partition wall 2 or at intersections of adjacent partition walls 2, and such position of the fin 3 relative to the partition wall 2 is determined by considering the number of fins 3 to be provided in each through hole 4.

The total surface area of the ceramic honeycomb body 1 depends on the number and the axial length of the through holes 4 and the circumferential length of the individual through holes 4 at their open ends. The circumferential length of the through hole 4 depends on both the shape of the through hole 4 defined by the surrounding partition walls 2 and the shape of the fins 3 therein. Here, the axial length of the through hole 4 is determined based on the use and the production method of the ceramic honeycomb body 1. Accordingly, the relation between the partition wall 2 and the fin 3 is important.

One of the objects of the present invention is to increase the surface area of the ceramic honeycomb body 1 by providing fins 3 on the partition wall 2. If the height of the fin 3 (in terms of the length of the fin 3 extending into the through hole 4 as measured from the surface of the partition wall 2) is too high, although the surface area is increased, the pressure loss of the gas being treated becomes too large. Accordingly, the height of the fin 3 is preferably less than 30% of the diameter of an inscribed circle of the through hole 4.

On the other hand, the preferable thickness of the fin 3 is the same as or less than the thickness of the partition wall 2 from the standpoint of thermal shock resistivity and ease of production.

In view of the thermal shock resistivity, it is preferably to dispose the fins 3 symmetrically with respect to the partition walls 2. With such symmetric disposition, the fins 3 are preferably secured to the planar surface of the partition wall 2 but not at intersections thereof, so as to keep the pressure loss low and to ensure effective action of the catalyzers.

Merits of different cross-sectional shapes of the through hole 4 defined by the partition walls 2 will be briefly reviewed while assuming that all other cell structures are the same. Among polygonal ones, the triangular shape as shown in the views (A) and (D) of FIG. 3 provides the largest geometrical surface area but their pressure loss is high and their thermal shock resistivity is low. The hexagonal shape as shown in the views (B) and (F) of FIG. 3 is excellent so far as the pressure loss is concerned.

However, as the number of corners in the polygonal shape increases, the mechanical strength is reduced and the formation of the dies for molding or extruding such polygonal partition walls 2 becomes more difficult. In the case of partition walls 2 for the circular through holes 4 as shown in the view (C) of FIG. 3, the geometrical surface area becomes smaller than that in the case of polygonal and utility of the catalyzers is reduced, and the weight increases. Accordingly, partition walls 4 defining rectangular through holes 4, as shown in the views (E) and (G), of FIG. 3 are preferable.

The disposition of the fins 3 is not restricted to the central portion of the ceramic honeycomb body 1 as shown in FIG. 1. In fact, such disposition is selected based on the performance requirement for the catalyzers and the required magnitude of the geometrical surface area. For instance, the fins 3 may be provided not only in the central portion but also in the surroundings thereof while reducing their height as the distance between the fin 3 and the center of the ceramic honeycomb body 1 increases as shown in FIG. 4.

The ceramic honeycomb body 1 is most frequently used in a straight passage of combustion gas as a combustion gas purifier because the structure of the ceramic honeycomb body 1 can be very simple in this case. When disposed in the straight combustion gas passage, the central portion of the ceramic honeycomb body 1 comes in contact with more combustion gas than any other portion thereof does, so that the fins 3 are preferably disposed in the through holes 4 at the central portion of the ceramic honeycomb body 1.

When the combusiton gas passage 1 is not straight, the through holes 4 with the fins 3 may be disposed at those portions where the flow rate of the combustion gas is the highest. Thus, the location of the fins 3 is not limited to the exact geometric central portion of the ceramic honeycomb body 1 in the present invention.

Material:

As the material of the ceramic honeycomb body, cordierite ceramics and alumina-titanate ceramics can be used from the standpoint of thermal shock resistivity. It is also possible to use ceramics of alumina, mullite, silicon carbide, silicon nitride, or zirconia type depending on the use and the ambient conditions of the ceramic honeycomb body. Furthermore, it is also possible to use ceramics with catalytic functions, for instance, solidified calcium aluminate cement mixed with metal oxides such as manganese dioxide and titanium oxide. Of the above materials, cordierite ceramics is the most preferable because after being molded by extrusion, as will be described hereinafter, it shows excellent thermal shock resistivity.

Method of Production:

(i) The ceramic honeycomb body of the invention can be produced by mixing and kneading the above material, molding it into the honeycomb form by extrusion, and sintering.

The formation by extrusion is suitable for producing a ceramic honeycomb body having long through holes as compared with the cross section thereof, such as a ceramic honeycomb body for purifying exhaust gas from internal combustion engines. As to the dies for extrusion, an inclined portion may be provided between honeycomb shaped grooves and a hole for feeding the material to be extruded so as to facilitate molding of the material into the honeycomb shape, as disclosed in Japanese Patent Publication No. 41,908/1980 (U.S. Pat. No. 3,790,654) and Japanese Patent Publication No. 61,592/1982 (U.S. Pat. No. 3,905,743). If cordierite material containing clay which is to be oriented in plate form is extruded, a ceramic honeycomb body having a low thermal expansion and a high thermal shock resistivity can be obtained, as dislcosed by Japanese Patent Laid-open Publication No. 75,611/1975 (U.S. Pat. No. 3,885,977). Accordingly, it is preferably in the present invention to extrude cordierite ceramic material so as to integrally form the fins with the partition walls and then to sinter the extruded body.

(ii) The present invention is not restricted to the above-mentioned extrusion but injection molding can be also used. When the through holes of the ceramic honeycomb body are short, as compared with the size of their cross section, it is possible to produce such a ceramic honeycomb body by pressing followed by sintering. In this case it is also possible to mold the ceramic material into a disc shape and to bore the through holes therein by a jig having a plurality of needles, and the disc with the bores may be sintered or solidified by curing.

EXAMPLE

A molding slip was prepared by kneading materials for cordierite crystals consisting of 25% of kaolin, 22% of calcined kaolin, 38% of talc, and 15% of alumina, while adding 3.5% of an organic auxiliary for extrusion molding and 30% of water. The molding slip was extruded by using dies which were disclosed by the above-mentioned Japanese Patent Publication No. 61,0592/1982. The extruded body was baked at 1,400° C.

Whereby, the following three kinds of specimens were produced.

Speciman A (see Table 1); Ceramic honeycomb body having through holes with fins, in the central portion with a diameter 50 mm, fins of heights 0.3 mm and width 0.2 mm being secured to the partition walls.

Specimen B (see Table 1); Ceramic honeycomb body devoid of protrusions, projections, ribs or fins, outside diameter 100 mm, height 127 mm, cell pitch 1.47 mm, rib thickness namely partition wall thickness 0.2 mm, cell density 300/in$^2$, and partition walls defining rectangular through holes.

Specimen C (see Table 1); Ceramic honeycomb body devoid of protrusions, projections, ribs or fins, except in the central portion wherein walls are present to further subdivide through holes in the body, said body having a diameter 50 mm, internal diameter in terms of cell pitch 0.74 mm and cell density 1,200/in$^2$.

The properties of the ceramic honeycomb body specimens thus prepared were measured and the results are shown in Table 1.

As can be seen from Table 1, Specimen A of the ceramic honeycomb body according to the invention proved that the geometrical surface area of the central portion thereof was made large without causing any reduction in the thermal shock resistivity and without any material increase of the pressure loss.

TABLE 1

| Specimen | Geometrical surface area (cm$^2$/cm$^3$) | | Thermal* shock resistivity (°C.) | Pressure** loss (mm H$_2$O) | Remarks |
| --- | --- | --- | --- | --- | --- |
| | Center | Periphery | | | |
| A | 33.03 | 23.56 | 950 | 120 | Invention |
| B | 23.56 | 23.56 | 950 | 105 | Reference |
| C | 39.68 | 23.56 | 850 | 140 | Reference |

Notes:
*The thermal shock resistivity was tested by applying 20 times of heat-cool cycles at each test temperature, each heat-cool cycle including heating at a specific test temperature starting from 700° C. for 5 minutes by a propane gas burner followed by forced cooling at room temperature in air for 5 minutes. The presence of cracks in the ceramic honeycomb body specimen was checked, and in case of no cracks, the above heat-cool cycle was repeated while increasing the test temperature by 25° C.until cracks were found. The thermal shock resistivity was listed as the highest test temperature before generating cracks.
**The pressure loss was tested by using room temperature air as the measuring medium, and the pressure loss was measured at a flow rate of 6 m$^3$/min in terms of the height of water column.

As described in detail in the foregoing, a ceramic honeycomb body according to the invention has fins integrally secured to the partition walls, so that it provides a large surface area for purifying gas being treated such as combustion gas so as to maximize the purifying efficiency.

Other outstanding features of the ceramic honeycomb body of the invention are as follows.

(1) A high thermal shock resistivity is provided because the fins are integrally secured to the partititon walls and the size of the through hole with the fins is made large.

(2) The effective gas passage is made homogeneous and the local acceleration of the catalyzer deterioration is eliminated by providing fins of the invention at those portions of the ceramic honeycomb body where the flow of combustion gas is concentrated. Thus, the conventional approaches of placing a gas dispersing member in front of the entrance of the ceramic honeycomb body or provision of different kinds of catalyzers at different portions of the ceramic honeycomb body are made unnecessary.

(3) The ceramic honeycomb body can be made easily by extrusion molding and the dies for that purpose can be easily produced. When the material is cordierite, an excellent thermal shock resistivity can be achieved.

The embodiments of the invention in which an exclusive property or privilege is claimed are defined as follows:

1. A ceramic honeycomb body comprising:
   a plurality of partition walls forming a plurality of through holes; and
   a plurality of fins integrally secured to said plurality of partition walls, such that said fins extend into said plurality of through holes only at a central portion of said ceramic honeycomb body and said fins do not meet to form walls to further subdivide said through holes.

2. The ceramic honeycomb body of claim 1, wherein an open cross-sectional area of said through holes having said fins extending thereinto for permitting a gas to flow therethrough is less than an open cross-sectional area of through holes at a peripheral portion of said ceramic honeycomb body which do not have fins extending thereinto.

3. The ceramic honeycomb body of claim 1, wherein said plurality of fins extend into said through holes in an amount less than 30% of a diameter of a circle inscribed into each of said plurality of through holes.

4. The ceramic honeycomb body of claim 3, wherein said through holes have a substantially square cross-section and siad fins extend into said through holes in an amount 20-30% of a length of one side of said square through holes.

5. The ceramic honeycomb body of claim 3, wherein said through holes have a cross-sectional shape selected from the group consisting of square, triangular, hexagonal, circular and rectangular.

6. The ceramic honeycomb body of claim 1, wherein said plurality of fins are integrally secured to said partition walls during extrusion of the ceramic honeycomb body and a subsequent sintering thereof and said partition walls and fins are made of cordierite.

7. The ceramic honeycomb body of claim 1, wherein a thickness of said plurality of fins is substantially equal to a thickness of said plurality of partition walls.

8. The ceramic honeycomb body of claim 1, wherein said plurality of fins block a cross-sectional area of gaseous flow in said plurality of through holes a different amount to control an amount of gaseous flow through said honeycomb body.

9. A ceramic honeycomb body for purifying exhaust gases from an engine comprising:
   a central portion and an outer peripheral portion, each of said central portion and outer peripheral portion being formed by a plurality of partition walls forming a plurality of through holes therein; and
   a plurality of fins integrally secured to said plurality of partition walls, such that said plurality of fins extend into said plurality of through holes only at said central portion of said ceramic honeycomb body, said fins restricting a flow of exhaust gases in said central portion relative to said outer peripheral portion and said fins do not meet to form walls to further subdivide said through holes.

10. The ceramic honeycomb body of claim 9, wherein an open cross-sectional area of said through holes having said fins extending thereinto for permitting a gas to flow therethrough is less than an open cross-sectional area of through holes at a peripheral portion of said ceramic honeycomb body which do not have fins extending thereinto.

11. The ceramic honeycomb body of claim 9, wherein said plurality of fins extend into said through holes in an amount less than 30% of a diameter of a circle inscribed into each of said plurality of through holes.

12. The ceramic honeycomb body of claim 11, wherein said through holes have a substantially square cross-section and said fins extend into said through holes in an amount 20-30% of a length of one side of said square through holes.

13. The ceramic honeycomb body of claim 11, wherein said through holes have a cross-sectional shape selected from the group consisting of square, triangular, hexagonal, circular and rectangular.

14. The ceramic honeycomb body of claim 9, wherein said plurality of fins are integrally secured to said partition walls during extrusion of the ceramic honeycomb body and a subsequent sintering thereof and said partition walls and fins are made of cordierite.

15. The ceramic honeycomb body of claim 9, wherein a thickness of said plurality of fins is substantially equal to a thickness of said plurality of partition walls.

16. The ceramic honeycomb body of claim 9, wherein said plurality of fins block a cross-sectional area of gaseous flow in said plurality of through holes a different amount to control an amount of gaseous flow through said honeycomb body.

17. A ceramic honeycomb body for purifying exhaust gases from an engine comprising:
   a central portion and an outer peripheral portion, each of said central portion and outer peripheral portion being formed by a plurality of partition walls forming a plurality of through holes; and
   a plurality of fins integrally secured to said plurality of partition walls, such that said fins extend into said plurality of through holes only at said central portion of said ceramic honeycomb structural body, said fins providing for a different amount of blockage of exhaust gases which pass through said plurality of through holes at said central portion relative to said outer peripheral portion and said fins do not meet to form walls to further subdivide said through holes.

18. The ceramic honeycomb body of claim 17, wherein said plurality of fins extend into said through holes in an amount less than 30% of a diameter of a circle inscribed into each of said plurality of through holes.

19. The ceramic honeycomb body of claim 18, wherein said through holes have a substantially square cross-section and said fins extend into said through holes in an amount 20-30% of a length of one side of said square through holes.

20. The ceramic honeycomb body of claim 18, wherein said through holes have a cross-sectional shape selected from the group consisting of square, triangular, hexagonal, circular and rectangular.

21. The ceramic honeycomb body of claim 17, wherein said plurality of fins are integrally secured to said partition walls during extrusion of the ceramic honeycomb body and a subsequent sintering thereof and said partition walls and fins are made of cordierite.

* * * * *